United States Patent [19]

Cirimele

[11] 4,245,212
[45] Jan. 13, 1981

[54] SERIAL DIGITAL DATA DECODER

[75] Inventor: Frank R. Cirimele, San Jose, Calif.

[73] Assignee: The United States of America as represented by the Secretary of the Navy, Washington, D.C.

[21] Appl. No.: 885,726

[22] Filed: Mar. 13, 1978

Related U.S. Application Data

[63] Continuation-in-part of Ser. No. 733,589, Oct. 18, 1976, abandoned.

[51] Int. Cl.² .............................................. H04Q 9/16
[52] U.S. Cl. ........................ 340/147 LP; 340/147 SY; 340/168 B; 371/69
[58] Field of Search ....... 340/146.1 BA, 518, 147 LP, 340/147 SY, 168 B

[56] References Cited

U.S. PATENT DOCUMENTS

| | | | |
|---|---|---|---|
| 3,252,139 | 5/1966 | Moore | 340/146.1 BA |
| 3,523,278 | 8/1970 | Hinkel | 340/146.1 BA |
| 3,772,649 | 11/1973 | Haselwood | 340/147 SY |
| 3,842,399 | 10/1974 | Knevier | 340/146.1 BA |
| 3,919,690 | 11/1975 | Field | 340/147 SY |
| 4,006,462 | 2/1977 | Podowski | 340/146.1 BA |

Primary Examiner—Harold I. Pitts
Attorney, Agent, or Firm—R. S. Sciascia; Charles D. B. Curry; Francis I. Gray

[57] ABSTRACT

A serial data decoder which is party-line compatible having a word verification circuit to enable the decoder when a word addressed to the decoder is received. A data word is received and shifted into a data memory where it is compared with a prior word. After n consecutive identical words are received a decode logic circuit is enabled to produce an output event. The output event is inhibited should any of the bits of the word being decoded be scrambled by a noise pulse.

7 Claims, 7 Drawing Figures

FIG_1

FIG_2B

FIG_2D

FIG_4

SERIAL DIGITAL DATA DECODER

CROSS-REFERENCE TO RELATED APPLICATION

This application is a continuation-in-part of Application Ser. No. 733,589 filed Oct. 18, 1976 for "A Serial Digital Data Decoder", subsequently abandoned.

BACKGROUND OF THE INVENTION

1. Field of the Invention

The present invention relates to digital data decoders, and more specifically to serial data decoders which are party-line compatible.

2. Description of the Prior Art

Prior decoders used to provide output commands to an interlocks system were analog in configuration. A digital decoder is desirable for its reduced size, its speed and its reliability.

Additionally, where a decoder must share a common input line with other decoders or devices, it is desirable to make the decoder party-line compatible so that it will reject data which is not applicable.

SUMMARY OF THE INVENTION

Accordingly, the present invention provides a serial data decoder which is party-line compatible and has a word verification circuit to enable the decoder when a valid word is received. Consecutive words are compared and, if the comparison is identical for n consecutive words, the word is decoded by the decoder logic and an output event is triggered. If consecutive words are not identical, or if a noise anomaly occurs during the comparison, the decoder logic is held disabled so that no spurious output will occur.

STATEMENT OF THE OBJECTS OF THE INVENTION

An object of the present invention is to provide a party-line compatible serial data decoder.

Another object of the present invention is to provide a comparison of consecutive words for determining validity of the words received.

Yet another object of the present invention is to provide a premature output turnoff when an invalid comparison between consecutive words occurs prior to n consecutive valid comparisons.

Other objects, advantages and novel features of the invention will become apparent from the following detailed description of the invention when considered in conjunction with the accompanying drawing wherein:

DESCRIPTION OF THE PREFERRED EMBODIMENT

Figure 1:
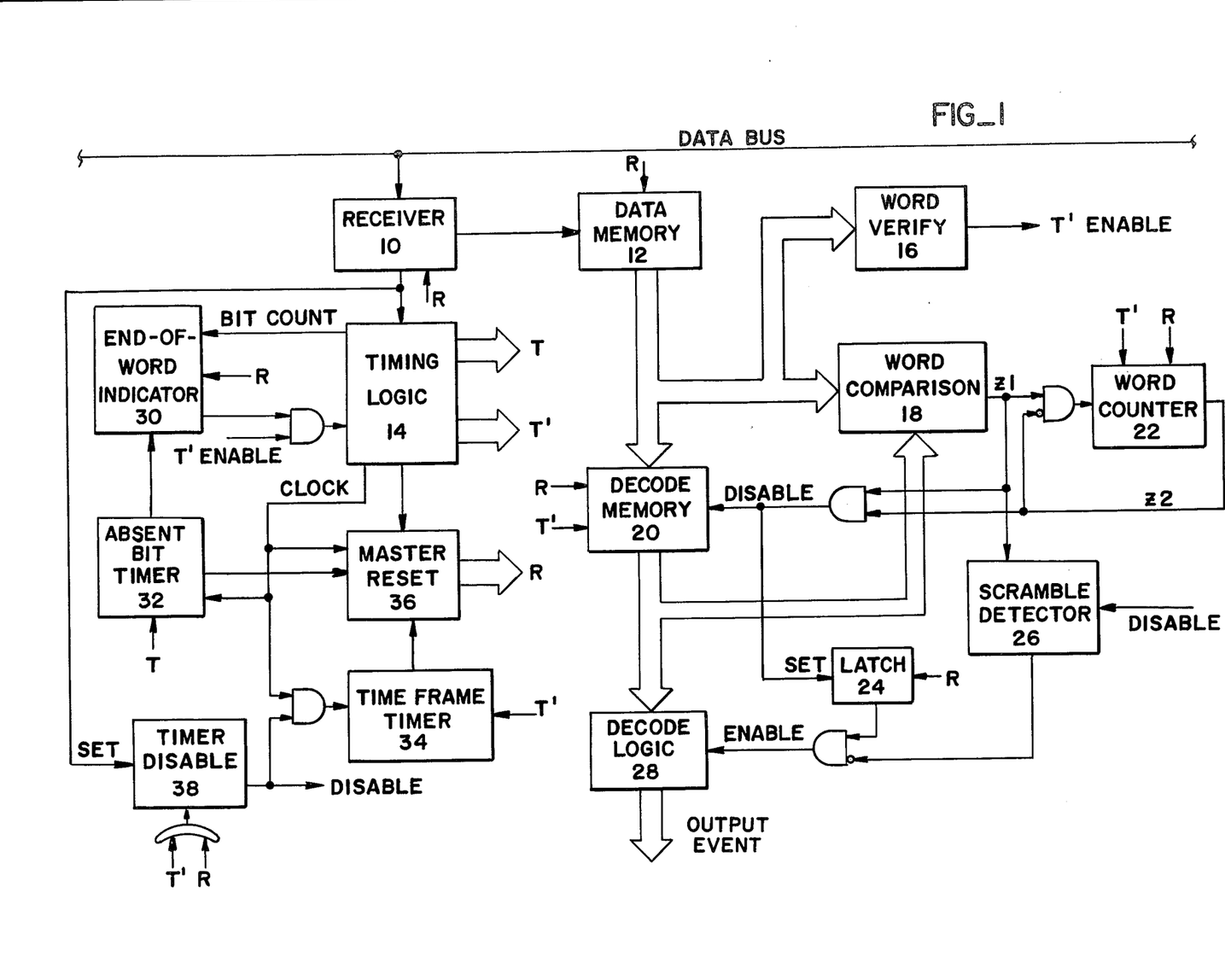
FIG. 1 is a block diagram of the serial digital decoder according to the present invention.

Referring now to FIG. 1, a serial data decoder responds only to digital words having a specific address code contained within specified bits of the word. A word arrives serially at a receiver 10 from a party-line data bus. The receiver 10 internally derives both a data clock strobe, QC, and digital compatible data, QD, from the individual word bits. The data clock strobe inputs the word to a data memory 12 as each bit is received. Additionally, the receiver 10 stimulates a timing logic circuit 14 to generate several serial timing pulses (T bit times) per word bit, one of which resets the receiver between bits of the word.

The word is stored serially in the data memory 12. A word verify circuit 16 checks the specified bits of the word which contain the address code to verify that the word is a valid one for the decoder. If the verification is valid, a T' enable signal is generated which in conjunction with an end-of-word indicator is input to the timer logic circuit 14 to allow several serial timing pulses (T' word times) to occur synchronously with the T bit times for the last bit of the word. The T bit times and the T' word times provide all the timing signals to operate the internal logic of the decoder. The timing logic circuit 14 contains an oscillator from which a system clock is derived which drives timers, to be described subsequently, synchronizes the T bit times and T' word times, and provides a time window for a master reset circuit 36.

A word comparison circuit 18 compares the last correctly coded word entered in the data memory 12 and the prior word in parallel. If the words are not equivalent, a z1 signal is not issued from the word comparison circuit 18 before the information in the data memory 12 is transferred to a decode memory 20 by a particular T' word time signal. Receipt of a subsequent identical word causes a z1 signal to occur at the output of the word comparison circuit 18 before the word is shifted to the decode memory 20 which in turn increments a word counter 22 by a particular T' word time signal for that word. Arrival of another identical word, corresponding to the third consecutive identical word, causes the word counter 22 to increment again. The nth consecutive identical word produces a count of n-1 which provides a z2 signal at the output of the word counter 22. Once a valid comparison has occurred, the word counter 22 will be reset if any subsequent consecutive word fails to provide a comparison, i.e., no z1 output from the word comparison circuit 18 before the word is shifted to the decode memory.

The presence of the z2 signal inhibits further incrementing of the word counter 22, and the presence of the z1 and z2 signals disables the transfer of any further words from data memory 12 to the decode memory 20. An output event in progress will be maintained as long as the words appearing every m seconds are identical.

The decode memory disable signal sets a latch 24. The set signal from the latch 24 and the absence of a signal from a scramble detector 26 enables a decode logic circuit 28, providing the output event according to the bit content of the information bits of the data word. The latch 24 is reset at the end of every word when there is no z1 or z2 signal present.

The scramble detector 26 provides an output signal only during the period between data words, i.e., the time frame when there are no input data words present on the party-line data bus. If between words any bits in the data memory 12 and/or decode memory 20 are scrambled, the z1 signal from the word comparison circuit 18 will drop out. The loss of the z1 signal causes the scramble detector 26 to remove the enable signal to the decode logic circuit 28, which turns off the word output event in progress. Subsequent data words are required to resume normal decoder operation again.

An end-of-word indicator 30 counts the bits of the incoming data word and prevents the T' word times from occurring until the last bit of the data word has been received and the word has been verified by the word verify circuit 16. In the event the receiver 10 did not receive all of the bits of the data word, an absent bit timer 32 resets the end-of-word indicator 30 after sufficient time has passed to allow the next bit of the word to be received. The absent bit timer 32 is reset at a particular T bit time for every bit of the data word. In normal operation the end-of-word indicator 30 resets itself after the last bit of the data word has been counted by recycling to zero.

A time frame timer 34 provides an output to a master reset circuit 36 to reset all the decoder circuits. Data words occurring every m seconds during an event prevent the time frame timer 34 from timing out by resetting it with a T' word time. Both the absent bit timer 32 and the time frame timer 34 operate from the system clock in the timing logic circuit 14; however, the time frame timer is disabled, $\overline{QT}$, during the inputting of the data word by a timer disable circuit 38 which is initiated by the first bit of the data word and is reset by a T' word time or a reset from the master reset circuit 36 when the absent bit timer 32 times out. The timer disable circuit 38 also disables the scramble detector 26 while a word is being received to inhibit an output event from occurring prior to validation of the word.

The various resets required for proper operation of the bistable elements in the decoder are generated in the master reset circuit 36 and are synchronized to various timing pulses arriving from the timing logic circuit 14, the absent bit timer 32 and the time frame timer 34. Master resetting of the decoder initializes all the bistable digital logic in the decoder, and any output event in progress would be turned off, requiring another stream of data words before providing an output event again.

Continuous resetting of the decoder takes place during the time when no data words appear on the data bus by the constant timing out of the time frame timer 34. This causes the bistable elements to continually initialize, eliminating the logic changing effects of any noise in the decoder.

Figures 2, 2A:
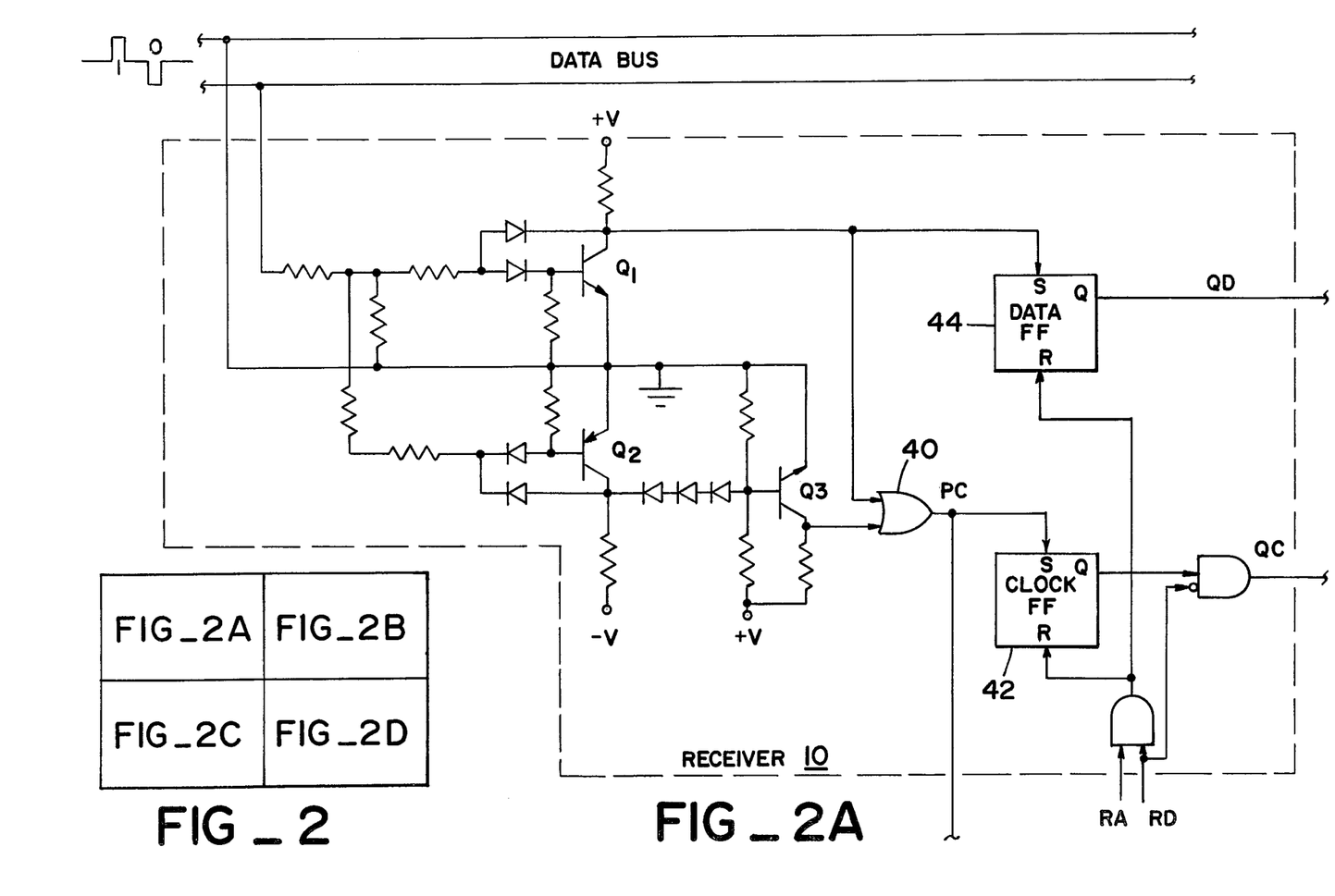
FIG. 2 shows the arrangement of FIGS. 2A, 2B, 2C and 2D, a schematic diagram of one embodiment of the serial digital decoder.
Figure 2B:
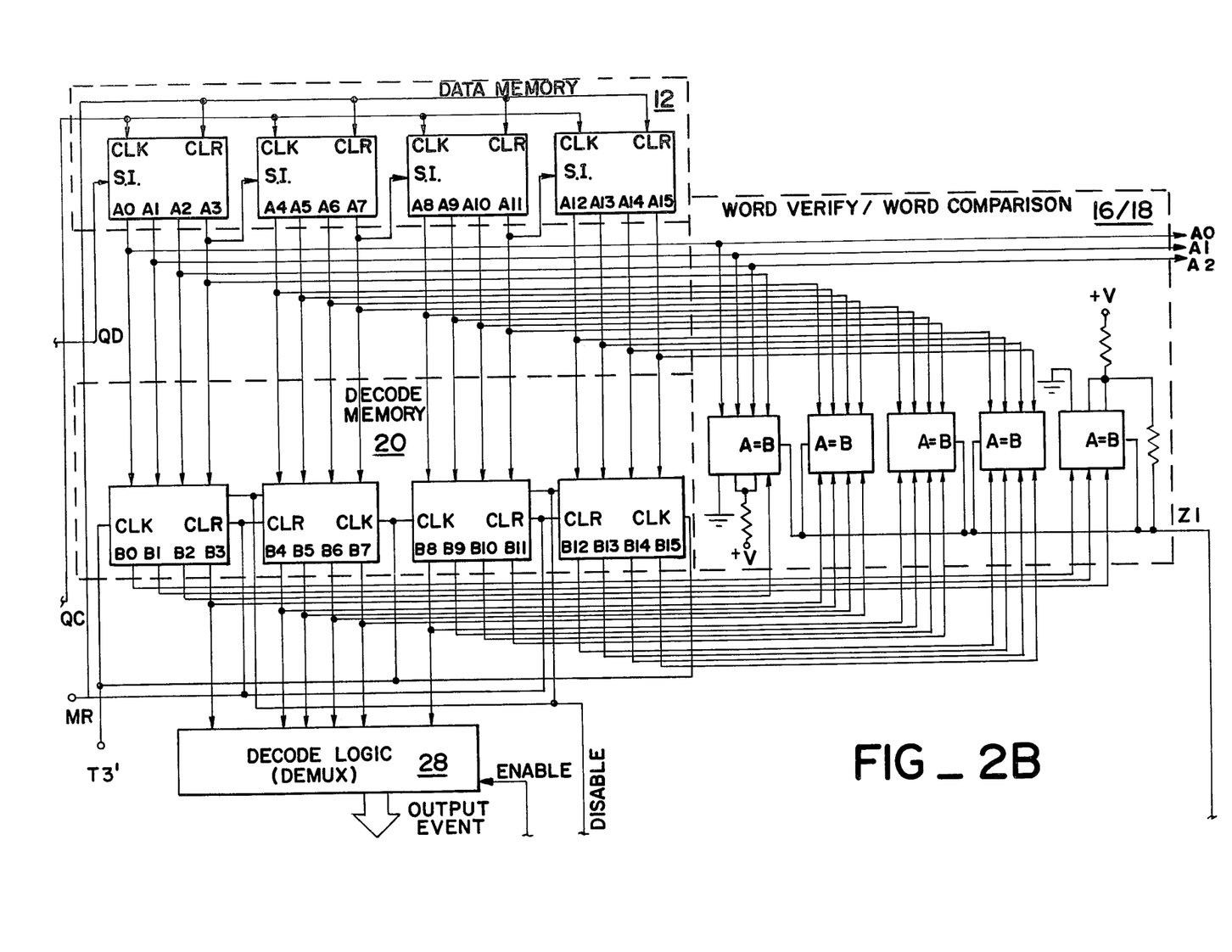
Figure 2C:
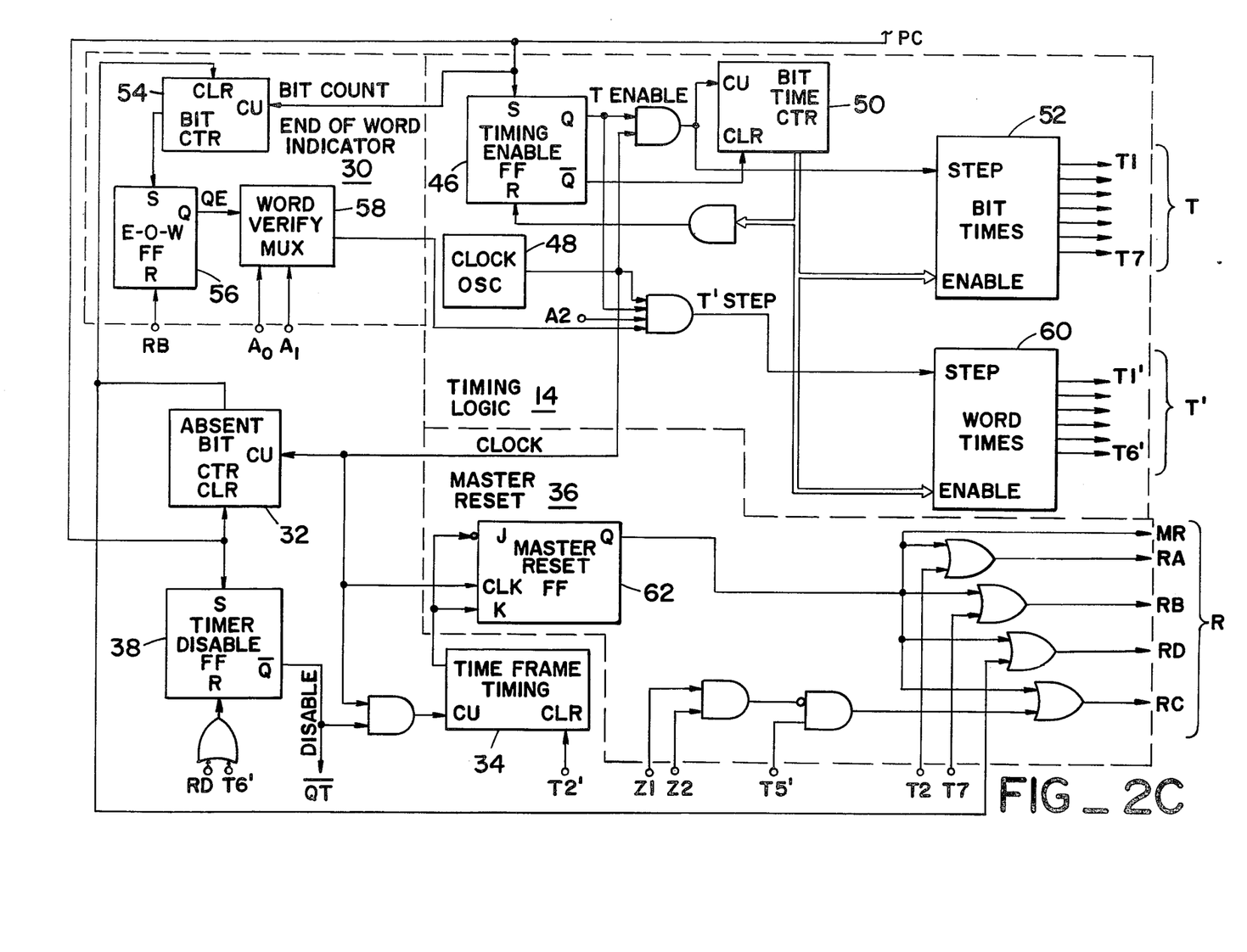
Figure 2D:
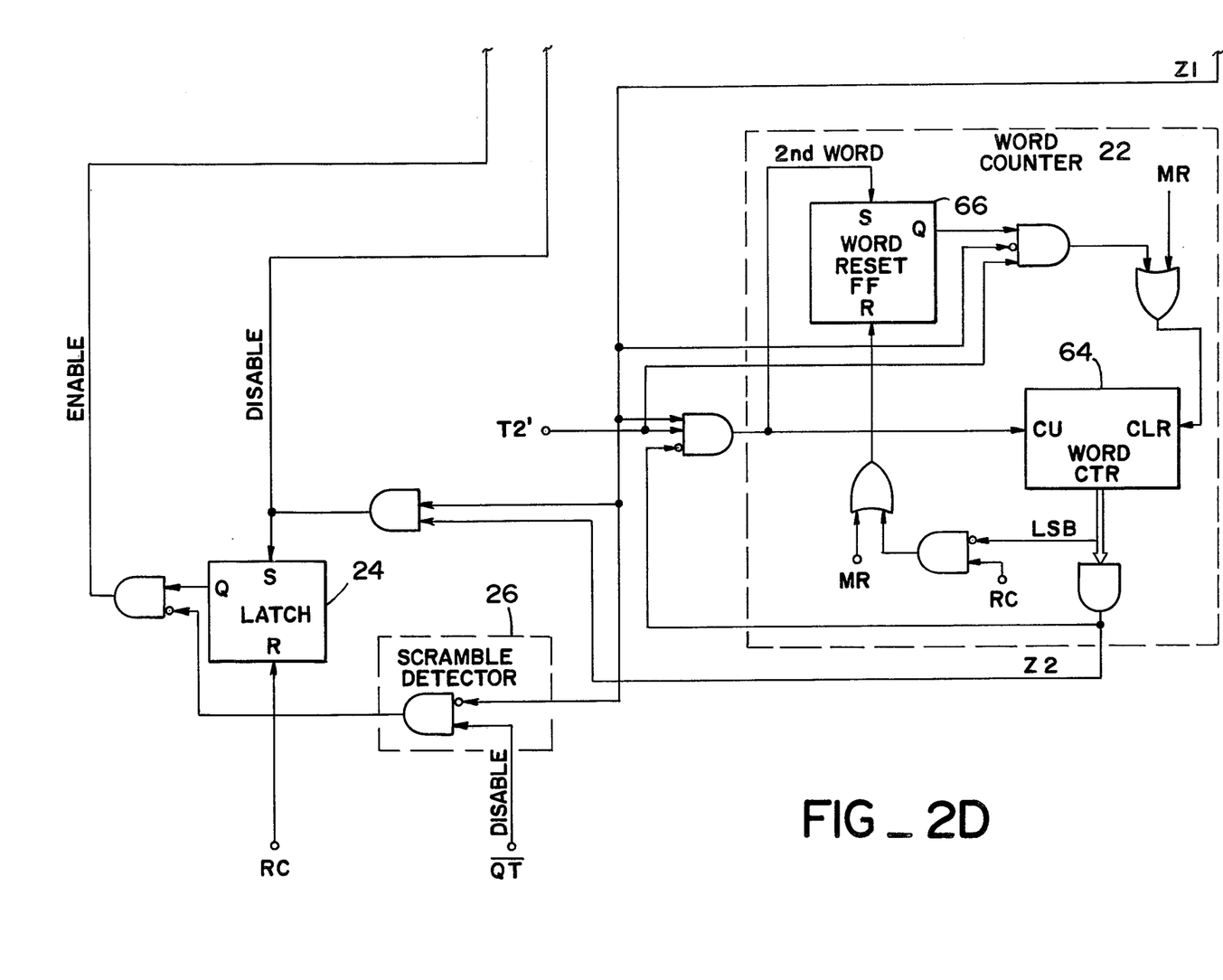

FIGS. 2A, 2B, 2C and 2D arranged as in FIG. 2 illustrate a specific embodiment for a particular application with 16-bit bi-polar digital words having three address bits, which embodiment requires three consecutive identical words to enable the output event. The positive portion of the bi-polar input to the receiver 10 causes Q1 to conduct, setting the output Q of data flip-flop 44 high to provide a QD pulse for positive input bits only. The data flip-flop 44 is reset between each bit so Q is low for negative input bits. The negative portion of the bi-polar input causes Q2 to conduct which in turn causes Q3 to conduct. Gate 40 provides a negative PC pulse for each negative data bit from Q1 and Q3, only one of which conducts at a time. A clock flip-flop 42 is, thus, set for each bit of input data (PC pulse) and reset between bits to provide a QC pulse.

Each QC pulse shifts the bits in the data memory 12 while serially adding a new bit according to the level of the QD pulse to the data memory. At the end of the data word if the address bits A0, A1, A2 are correct the word is shifted in parallel to the decode memory 20 unless the decode memory is disabled. The word in the data memory 12 is compared in parallel for equality by the word comparator 18 with the previous word in the decode memory before being shifted to the decode memory. The z1 pulse is output from the word comparator 18 upon equality comparison. When the required number of sequential identical words has been attained, the decode logic 28 is enabled and the command bits of the word in the decode memory 20 are decoded and the output event for that word initiated.

Each PC pulse sets timing enable flip-flop 46 and clock pulses from the clock oscillator 48 are counted by a bit time counter 50. The output of the bit time counter enables the bit times counter 52 and word times counter 60 to provide T and T' times. The clock pulses are applied to the bit times counter 52 to produce the T1–T7 times for each data bit. When the bit time counter 50 reaches all "1"s for the eighth count it resets the timing flip-flop 46, inhibiting further T and T' times until the next bit.

The PC pulses are counted by a cyclic bit counter 54 which sets an end-of-word flip-flop 56 after 16 bits to provide a QE signal to a word verify multiplexer 58 which is combined with the T enable from the timing flip-flop 46 and the clock pulses to step the word times counter 60 only if the address of the word is correct for the decoder. The end-of-word flip-flop 56 is reset by the last T time for the bit in process, so the word times counter 60 produces T1'–T6' times for the last bit of the word in process only.

The absent bit timer 32 counts the clock pulses between bits and clears the bit counter 54 if no PC pulse is received to clear the timer within the time allowed between successive data bits. The PC pulse also sets the timer disable flip-flop 38 which inhibits the time frame counter 34. The timer disable flip-flop 38 is reset at the end of each data word or by timeout of the absent bit counter 32. The time frame counter 34 counts the clock pulses between words and clocks a master reset flip-flop 62 if a data word is not received within a specified time. The time frame counter 34 is cleared after each word so the master reset flip-flop 62 will not be clocked when data words are being received continuously. The remaining resets are provided by various T and T' times and the z1 and z2 signals.

Transfer of data words to the decode memory 20 and setting of latch 24 occur when there have been three consecutive identical word comparisons, i.e., z1 and z2 are "1", which also enables the decode logic 28. If z1 drops out between words the scramble detector 26, enabled by $\overline{QT}$ from the timer disable flip-flop, inhibits the decode logic 28 and the output event in progress. Until the third word is compared a word counter 64 counts the z1 pulses at the end of each word. On the second word received, the first comparison, z1 sets a word reset flip-flop 66 which enables an AND gate to clear the word counter 64 so that if there is no z1 pulse at T2' time of the next comparison, i.e., third word, the word counter is reset to start the count again. The LSB of the word counter 64 enables an AND gate to reset the word reset flip-flop 66 at T5' time when the word counter is reset.

Figure 3:
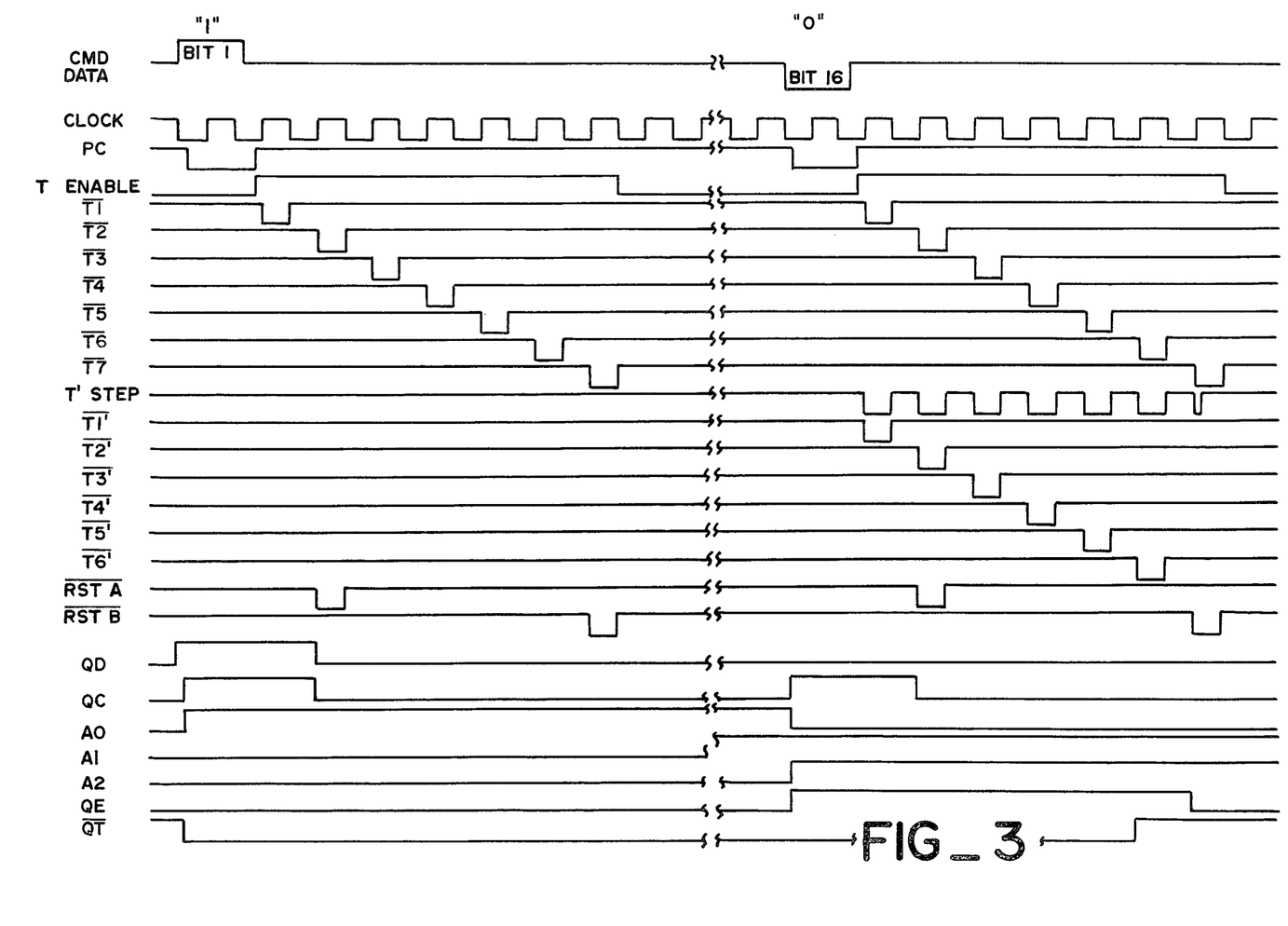
FIG. 3 is a timing diagram for the serial digital decoder showing the timing generated by each bit of a received data word.
Figure 4:
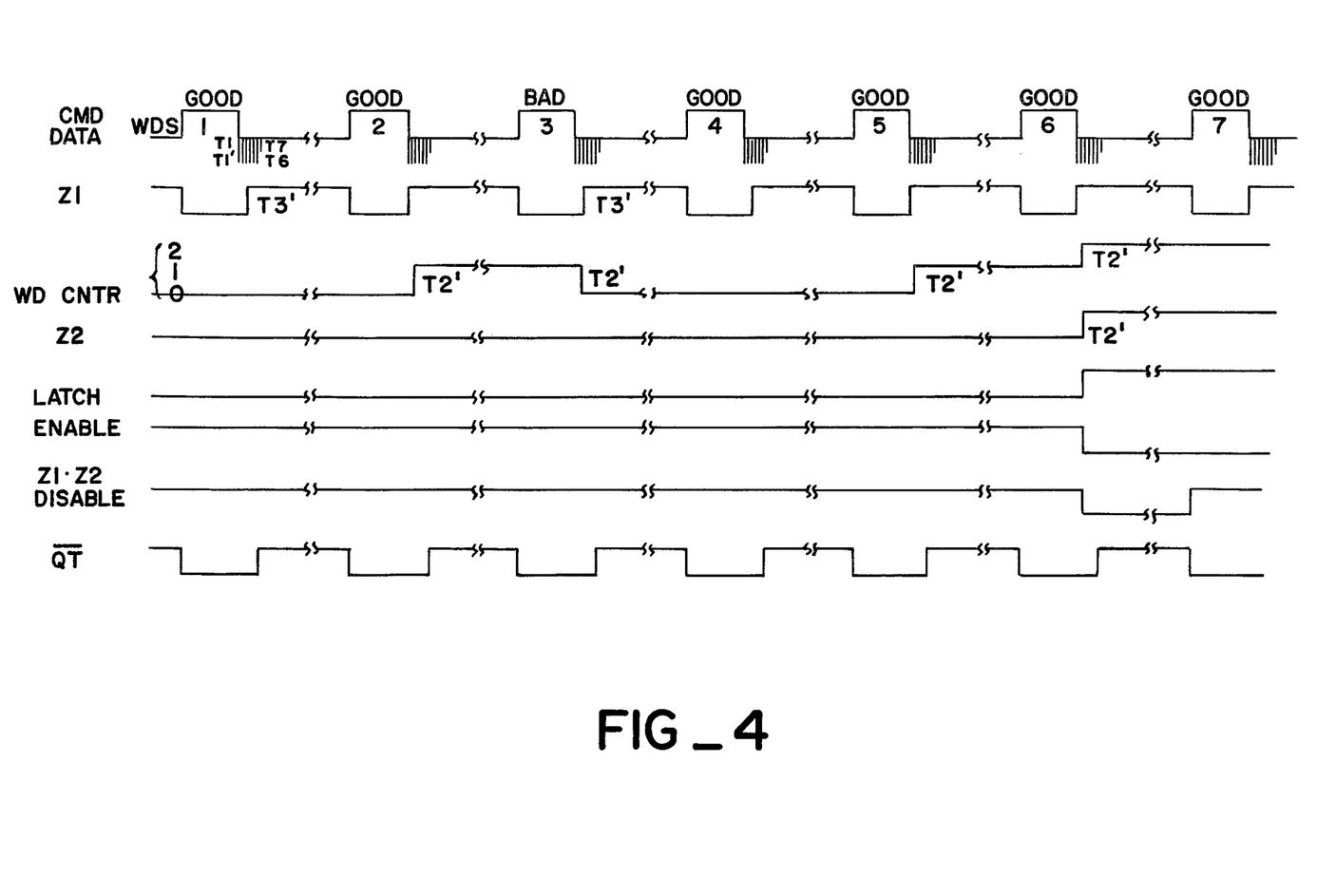
FIG. 4 is a timing diagram for the serial digital decoder showing the comparison timing generated by the received data words.

FIG. 3 shows the derivation of T times for each data bit and the derivation of T' times for the last data bit (16 in this example) of a data word from the clock oscillator 48. The entire sequence of operation is illustrated in FIG. 4 where a series of command data words is received. z1 goes low as a new data word is being received because there is no comparison as the data is shifted into the data memory 12. At T3' time with no valid comparison the word from the data memory 12 is transferred to the decode memory 20, resulting in a valid comparison out of the comparator 18. When the second word is compared z1 goes high as soon as the last bit is shifted into the data memory 12. At T2' time the word counter 64 is incremented. If the next word is invalid, at T2' the word counter 64 is reset since z1 is still low. If the third word is valid, at T2' time the word counter 64 is incremented again and z2 goes high, setting the latch 24, enabling the decode logic 28 and disabling transfer from the data memory 12 to the decode memory 20. The word in the decode memory 20 is decoded by the decode logic 28 and executed so long as the scramble detector 26 does not detect an anomaly caused by noise.

Thus, the present invention provides a party-line compatible decoder which will produce an output event only after n consecutive identical words, and which will effectively block any spurious outputs.

What is claimed is:

1. A serial digital data decoder comprising:
   (a) means for receiving a serial data word from a data bus;
   (b) means for storing said data word as it is received;
   (c) means for verifying that said data word is addressed to said decoder;
   (d) means for detecting n consecutive identical data words before enabling an output event specified by said data word;
   (e) means for inhibiting said output event between consecutive data words when a spurious signal alters said output event data word; and
   (f) means for deriving timing signals from said data word to operate the internal circuitry of said serial digital data decoder.

2. A decoder as recited in claim 1 wherein said detecting means comprises:
   (a) a memory to which is transfered said data word from said storing means after said data word has been verified by said verifying means;
   (b) a word comparator for comparing said data word from said memory with a consecutive data word from said storing means in parallel;
   (c) a counter which increments for each identical word comparison detected by said word comparator and which resets when a non-identical comparison is detected; and
   (d) means for terminating the incrementing of said counter when n consecutive identical data words have been detected and for enabling said output event.

3. A decoder as recited in claim 2 wherein said inhibiting means comprises:
   (a) means for decoding said data word from said memory to initiate said output event; and
   (b) a scramble detector to prevent said decoding means from initiating said output event between said consecutive data words in the event either of the data words contained in said storing means and said memory is scrambled by a spurious signal.

4. A decoder as recited in claim 3 wherein said deriving means comprises:
   (a) means for providing timing pulses for each bit of said data word, and for each complete verified data word received; and
   (b) means for resetting the elements of said decoder after an output event has been completed and when an error is detected.

5. A decoder as recited in claim 4 wherein said deriving means further comprises:
   (a) means for determining the end of each of said data words received and for enabling said timing pulses for each complete verified data word;
   (b) means for restarting said determining means when a missing bit of said data word is detected;
   (c) means for resetting the internal circuitry of said serial digital data decoder when a subsequent data word is not received within a predetermined time interval, and periodically between data word sequences; and
   (d) means for disabling said resetting means and said inhibiting means while said data word is being received to prohibit initiation of said output event prior to verification of said data word by said verifying means.

6. A decoder as recited in claim 1 wherein said receiving means comprises:
   (a) means for obtaining a data clock strobe from each bit of said data word to input said data word to said storing means; and
   (b) means for converting the bits of said data word into digital compatible data for storage in said storing means.

7. A decoder as recited in claim 1 wherein said receiving means further comprises means for triggering said deriving means for each bit of said data word.

* * * * *